(12) United States Patent
Torres et al.

(10) Patent No.: US 7,977,300 B2
(45) Date of Patent: *Jul. 12, 2011

(54) LAUNDRY CARE COMPOSITIONS WITH THIAZOLIUM DYE

(75) Inventors: Eduardo Torres, Boiling Springs, SC (US); Laurent D. Kieken, Greenville, SC (US); Patrick D. Moore, Pacolet, SC (US); Dominick J. Valenti, Greenville, SC (US); Robert L. Mahaffey, Spartanburg, SC (US); Cecile Pasquier, Marly (CH); Manuela Javet, Marly (CH); Mu-ill Lim, West Chester, OH (US); Eugene Steven Sadlowski, Cincinnati, OH (US); Mark Robert Sivik, Mason, OH (US); Kevin Lee Kott, Cincinnati, OH (US); Keith Homer Baker, Cincinnati, OH (US)

(73) Assignee: Milliken & Co., Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,738

(22) Filed: Jan. 12, 2010

(65) Prior Publication Data

US 2010/0125133 A1    May 20, 2010

Related U.S. Application Data

(62) Division of application No. 11/655,343, filed on Jan. 19, 2007, now Pat. No. 7,674,757.

(60) Provisional application No. 60/761,428, filed on Jan. 23, 2006.

(51) Int. Cl.
*D06P 5/13* (2006.01)

(52) U.S. Cl. ........................................... 510/392; 8/403
(58) Field of Classification Search .................. 510/392; 8/403

See application file for complete search history.

(56) References Cited

U.S. PATENT DOCUMENTS

| | | | |
|---|---|---|---|
| 3,082,114 A | 3/1963 | Balli et al. | |
| 3,163,972 A * | 1/1965 | Irwin | 53/138.3 |
| 3,629,241 A | 12/1971 | Krause et al. | 260/239.9 |
| 3,961,880 A | 6/1976 | Reinert et al. | 8/17 |
| 4,134,725 A * | 1/1979 | Buchel et al. | 8/526 |
| 4,137,243 A | 1/1979 | Farmer | 260/378 |
| 4,269,768 A * | 5/1981 | Neeb et al. | 534/589 |
| 4,298,490 A | 11/1981 | Lange et al. | 252/91 |
| 4,382,801 A * | 5/1983 | Loew | 8/538 |
| 4,601,725 A | 7/1986 | Keller et al. | 8/403 |
| 4,638,053 A * | 1/1987 | Neeb et al. | 534/589 |
| 4,871,371 A | 10/1989 | Harris | 8/403 |
| 4,877,411 A * | 10/1989 | Hines et al. | 8/403 |
| 4,912,203 A | 3/1990 | Kluger et al. | 534/729 |
| 4,992,204 A | 2/1991 | Kluger | 252/301.16 |
| 5,039,782 A | 8/1991 | Langer et al. | 528/272 |
| 5,082,578 A | 1/1992 | Langer et al. | 252/8.7 |
| 5,163,972 A | 11/1992 | Herter et al. | 8/655 |
| 5,164,100 A | 11/1992 | Langer et al. | 252/8.6 |
| 5,574,179 A | 11/1996 | Wahl et al. | 554/110 |
| 5,714,452 A | 2/1998 | Brouwer | 510/394 |
| 5,728,671 A | 3/1998 | Rohrbaugh et al. | 510/394 |
| 5,929,216 A * | 7/1999 | Herter et al. | 534/611 |
| 5,948,153 A | 9/1999 | Ann et al. | 106/31.43 |
| 6,150,494 A | 11/2000 | Wang et al. | 528/289 |
| 6,723,846 B1 | 4/2004 | Metzger et al. | 544/193.2 |
| 2001/0031806 A1 | 10/2001 | Lutkenhorst et al. | 524/106 |
| 2004/0018787 A1 | 1/2004 | Bullock | |
| 2005/0095933 A1 | 5/2005 | Kimbrell | |
| 2005/0235429 A1 | 10/2005 | Weber et al. | 8/115.51 |
| 2005/0288206 A1 | 12/2005 | Sadlowski et al. | 510/392 |
| 2005/0288207 A1 | 12/2005 | Sadlowski et al. | 510/392 |
| 2006/0079438 A1 | 4/2006 | Brush et al. | 510/516 |
| 2006/0183658 A1 | 8/2006 | Sadlowski et al. | 510/392 |
| 2007/0169284 A1* | 7/2007 | Pasquier | 8/405 |

FOREIGN PATENT DOCUMENTS

| | | |
|---|---|---|
| DE | 25 59 737 | 9/1977 |
| DE | 216 953 | 1/1985 |
| EP | 0 215 322 | 3/1987 |
| EP | 0 369 599 | 5/1990 |
| GB | 1 276 686 | 6/1972 |
| GB | 1 411 243 | 10/1975 |
| GB | 2 011 458 | 7/1979 |
| WO | 2006/004876 | 1/2006 |
| WO | WO 2006/021285 | 3/2006 |
| WO | WO 2006/027086 | 3/2006 |
| WO | WO 2006/032327 | 3/2006 |
| WO | WO 2006/032397 | 3/2006 |

OTHER PUBLICATIONS

U.S. Appl. No. 11/655,380, filed Jan. 19, 2007, Valenti et al.
Material Safety Data Sheet—Alphazurine A.
"The affinity of basic dyes for leacril 16 acrylic fibre," Journal of The Society of Dyers and Colourists, vol. 99 No. 10. Oct. 1983 pp. 289-291 XP008080453 p. 290. table 1; compounds 1-8.
"Ricerche sui coloranti cationici per fibra acrillica", La Chimica E L'Industria. vol. 56, No. 7 Jul. 1974 pp. 495-497. XP008080417. Milan p. 496, table 1, compounds 1-14.

* cited by examiner

*Primary Examiner* — Milton I Cano
*Assistant Examiner* — M. Reza Asdjodi
(74) *Attorney, Agent, or Firm* — Brenda D. Wentz

(57) ABSTRACT

The present invention relates to thiazolium dyes and laundry care compositions comprising one or more thiazolium dyes. The dyes and compositions are advantageous in providing improved hueing of fabric, including whitening of white fabric, while avoiding significant build up of bluing dyes on the fabric.

4 Claims, No Drawings

LAUNDRY CARE COMPOSITIONS WITH THIAZOLIUM DYE

CROSS-REFERENCES TO RELATED APPLICATIONS

This application claims priority under 35 U.S.C. §119(e) to U.S. Provisional Application Ser. No. 60/761,428 filed Jan. 23, 2006. This application also claims priority to, and is a divisional of, U.S. patent application Ser. No. 11/655,343 filed on Jan. 19, 2007, now U.S. Pat. No. 7,674,757 B2 and is hereby entirely incorporated by reference.

FIELD OF THE INVENTION

The present invention relates to thiazolium dyes, laundry care compositions comprising one or more thiazolium dyes, processes of making such dyes and laundry care compositions and methods of using same.

BACKGROUND OF THE INVENTION

Fabrics, typically lighter colored fabrics such as white fabrics, that are worn and/or laundered typically discolor. For example, white fabrics which are repeatedly laundered can exhibit a yellowing in color appearance which causes the fabric to look older and worn. In an effort to overcome such fabric discoloration, certain laundry detergent products include a hueing or bluing dye which attaches to fabric during the laundry wash and/or rinse cycle. Unfortunately, such hueing or bluing dye typically tends to accumulate on the fabric, thus giving the fabric an undesirable bluish tint. As a result, a chlorine treatment is generally employed to reduce the aforementioned accumulation of bluing dyes. While a chlorine treatment can be effective, it is an additional, inconvenient step in the laundry process. Additionally, a chlorine treatment is costly and harsh on fabrics—contributing to increased fabric degradation. Accordingly, a need exists for improved laundry care products which can counter the undesirable discoloration of fabrics, including the yellowing of white fabrics.

SUMMARY OF THE INVENTION

The present invention relates to thiazolium dyes, laundry care compositions comprising one or more thiazolium dyes, processes of making such dyes and laundry care compositions and methods of using same. The dyes, compositions and methods of the present invention are advantageous in providing improved hueing of fabric, including whitening of white fabric, while avoiding significant build up of bluing dyes on the fabric.

DETAILED DESCRIPTION OF THE INVENTION

Definitions

As used herein, the term "laundry care composition" includes, unless otherwise indicated, granular, powder, liquid, gel, paste, bar form and/or flake type washing agents and/or fabric treatment compositions.

As used herein, the term "fabric treatment composition" includes, unless otherwise indicated, fabric softening compositions, fabric enhancing compositions, fabric freshening compositions and combinations there of. Such compositions may be, but need not be rinse added compositions.

As used herein, the articles including "the", "a" and "an" when used in a claim, are understood to mean one or more of what is claimed or described.

As used herein, the terms "include", "includes" and "including" are meant to be non-limiting.

As used herein, the term polyether is defined as at least two repeating ether units that are chemically bound via the ethers' oxygen atoms. Such polyethers may be derived from materials including but not limited to ethylene oxide, propylene oxide, butylene oxide, hexylene oxide, glycidol, epichlorohydrin, pentaerythritol, glucose or combinations thereof.

As used herein capped polyether means a polyether that terminates in an alkyl or aryl moiety, including but not limited to a moiety selected from methyl, ethyl, butyl, isopropyl, tertiary butyl, amyl, benzyl, pentyl, and acetyl moieties.

As used herein "EO" stands for an ethylene oxide moiety.

As used herein "PO" stands for a propylene oxide moiety.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

Laundry Care Compositions

In one aspect, a laundry care composition that may comprise a laundry care ingredient and a suitable thiazolium dye is disclosed. Suitable thiazolium dyes include thiazolium dyes that exhibit good tinting efficiency during a laundry wash cycle without exhibiting excessive undesirable build up after laundering. Thus, undesirable bluing after repeated washings with the detergent compositions of the invention is avoided and costly and harsh chlorine treatments are unnecessary. Suitable thiazolium dyes include those thiazolium dyes that are described under the heading "Suitable Thiazolium Dyes" of the present specification.

In one aspect, the laundry care compositions disclosed in the present specification can employ the thiazolium dyes disclosed in the present specification as detailed by Formulae V through VIII of the present specification.

In one aspect suitable thiazolium dyes include thiazolium dye molecules numbers 1-80 as detailed in Tables 1 and 2 of the present specification.

In one aspect, suitable thiazolium dyes include thiazolium dye molecules numbers 1, 4, 5, 7, 8, 12, 13, 15, 16, 17, 21, 24, 25, 26, 30, 31, 33, 36, 38, 40, 45 and 48 as detailed in Tables 1 and 2 of the present specification.

In one aspect, suitable thiazolium dyes include thiazolium dye molecules numbers 12, 13, 15, 16, 24, 25, 26, 30, 31, 33, 36, 38, 40, 45 and 48 as detailed in Tables 1 and 2 of the present specification.

In one aspect, the laundry care compositions disclosed in the present specification can employ combinations of any of the suitable thiazolium dyes disclosed in the present specification.

In one aspect, the laundry care compositions disclosed in the present specification can employ a non-hueing dye in combination with the thiazolium dye. The non-hueing dye may be selected from non-hueing dyes disclosed in U.S. Patent Application 2005/028820A1, U.S. Pat. No. 4,137,243, U.S. Pat. No. 4,601,725 and U.S. Pat. No. 4,871,371. While not being bound by theory, it is believed that the combination of both a thiazolium dye and a non-hueing dye allows for flexibility to color blend to a desired hue.

In one aspect, the laundry care compositions disclosed in the present specification can employ a non-hueing dye, that may be non-substantive in nature, in combination with the thiazolium dye. The combination of both a thiazolium dye and a non-hueing dye can allow customization of product color and fabric tint. In one aspect, Acid Blue 7 may be employed as a non-hueing, non-tinting dye.

In one aspect, any of the components, including the suitable thiazolium dyes, may be employed in the laundry care compositions in an encapsulated form. Such encapsulates may comprise one or more of such components.

In one aspect a laundry care compositions comprising a thiazolium dye and a laundry care ingredient and having a hueing efficiency of greater than 10 but less than 40, from about 15 to about 35, or even from about 15 to about 30 and a wash removability of from about 30% to about 85%, from about 40% to about 85%, from about 50% to about 85% are disclosed.

Suitable laundry care ingredients include, but are not limited to, those materials described in the present specification as useful aspects of the present invention, including adjunct materials as described in the present specification.

Liquid, Laundry Detergent Compositions

In one aspect, the laundry care compositions disclosed herein, may take the form of liquid, laundry detergent compositions. In one aspect, such compositions may be a heavy duty liquid composition. Such compositions may comprise a sufficient amount of a surfactant to provide the desired level of one or more cleaning properties, typically by weight of the total composition, from about 5% to about 90%, from about 5% to about 70% or even from about 5% to about 40% and a sufficient of suitable thiazolium dye that is described under the heading "Suitable Thiazolium Dyes" of the present specification, to provide a tinting effect to fabric washed in a solution containing the detergent, typically by weight of the total composition, from about 0.0001% to about 0.05%, or even from about 0.001% to about 0.01%.

The liquid detergent compositions comprise an aqueous, non-surface active liquid carrier. Generally, the amount of the aqueous, non-surface active liquid carrier employed in the compositions herein will be effective to solubilize, suspend or disperse the composition components. For example, the compositions may comprise, by weight, from about 5% to about 90%, from about 10% to about 70%, or even from about 20% to about 70% of an aqueous, non-surface active liquid carrier.

The most cost effective type of aqueous, non-surface active liquid carrier may be water. Accordingly, the aqueous, non-surface active liquid carrier component may be generally mostly, if not completely, water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids may be minimized to hold down composition cost. Accordingly, the aqueous liquid carrier component of the liquid detergent products herein will generally comprise water present in concentrations ranging from about 5% to about 90%, or even from about 20% to about 70%, by weight of the composition.

The liquid detergent compositions herein may take the form of an aqueous solution or uniform dispersion or suspension of surfactant, thiazolium dye, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, more preferably from about 150 to 400 cps. For purposes of this invention, viscosity is measured with a Brookfield LVDV-II+ viscometer apparatus using a #21 spindle.

Suitable surfactants may be anionic, nonionic, cationic, zwitterionic and/or amphoteric surfactants. In one aspect, the detergent composition comprises anionic surfactant, nonionic surfactant, or mixtures thereof.

Suitable anionic surfactants may be any of the conventional anionic surfactant types typically used in liquid detergent products. Such surfactants include the alkyl benzene sulfonic acids and their salts as well as alkoxylated or non-alkoxylated alkyl sulfate materials.

Exemplary anionic surfactants are the alkali metal salts of $C_{10-16}$ alkyl benzene sulfonic acids, preferably $C_{11-14}$ alkyl benzene sulfonic acids. In one aspect, the alkyl group is linear. Such linear alkyl benzene sulfonates are known as "LAS". Such surfactants and their preparation are described for example in U.S. Pat. Nos. 2,220,099 and 2,477,383. Especially preferred are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In a specific embodiment, R' is $C_{10}$-$C_{18}$ alkyl, n is from about 1 to 15, and M is sodium, potassium, ammonium, alkylammonium, or alkanolammonium. In more specific embodiments, R' is a $C_{12}$-$C_{16}$, n is from about 1 to 6 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3^-M^+$ wherein R is typically a linear $C_8$-$C_{20}$ hydrocarbyl group, which may be straight chain or branched chain, and M is a water-solubilizing cation. In specific embodiments, R is a $C_{10}$-$C_{15}$ alkyl, and M is alkali metal, more specifically R is $C_{12}$-$C_{14}$ and M is sodium.

Specific, nonlimiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates having formulae (I) and (II):

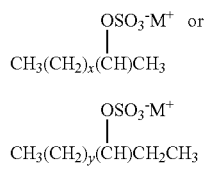

wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of preferred cations including sodium, potassium, ammonium, and mixtures thereof, and x is an integer of at least about 7, preferably at least about 9, and y is an integer of at least 8, preferably at least about 9; d) $C_{10}$-$C_{18}$ alkyl alkoxy sulfates ($AE_xS$) wherein preferably x is from 1-30; e) $C_{10}$-$C_{18}$ alkyl alkoxy carboxylates preferably comprising 1-5 ethoxy units; f) mid-chain branched alkyl sulfates as discussed in U.S. Pat. No. 6,020,303 and U.S. Pat. No. 6,060,443; g) mid-chain branched alkyl alkoxy sulfates as discussed in U.S. Pat. No. 6,008,181 and U.S. Pat. No. 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. Preferred for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. Preferably $R^1$ is an alkyl group, which may be primary or secondary, that contains from about 9 to 15 carbon atoms, more preferably from about 10 to 14 carbon atoms. In one embodiment, the alkoxylated fatty alcohols will also be ethoxylated materials that contain from about 2 to 12 ethylene oxide moieties per molecule, more preferably from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17. More preferably, the HLB of this material will range from about 6 to 15, most preferably from about 8 to 15. Alkoxylated fatty alcohol nonionic surfactants have been marketed under the tradename Neodol® by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, preferably from 10 to 16 carbon atoms, and is more preferably $C_{12}$-$C_{16}$ primary alkyl. R' is a short-chain moiety, preferably selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x 1-30, as discussed in U.S. Pat. No. 6,153,577, U.S. Pat. No. 6,020,303 and U.S. Pat. No. 6,093,856; f) Alkylpolysaccharides as discussed in U.S. Pat. No. 4,565,647 Llenado, issued Jan. 26, 1986; specifically alkylpolyglycosides as discussed in U.S. Pat. No. 4,483,780 and U.S. Pat. No. 4,483,779; g) Polyhydroxy fatty acid amides as discussed in U.S. Pat. No. 5,332,528, WO 92/06162, WO 93/19146, WO 93/19038, and WO 94/09099; and h) ether capped poly (oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (preferably $C_{12}$ to $C_{18}$) amine oxides and sulfo and hydroxy betaines, such as N-alkyl-N,N-dimethylamino-1-propane sulfonate where the alkyl group can be $C_8$ to $C_{18}$, preferably $C_{10}$ to $C_{14}$.

Non-limiting examples of ampholytic surfactants include: aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

Granular Laundry Detergent Compositions

In one aspect, the laundry care compositions disclosed herein, may take the form of granular, laundry detergent compositions. Such compositions may comprise a sufficient of suitable thiazolium dye that is described under the heading "Suitable Thiazolium Dyes" of the present specification, to provide a tinting effect to fabric washed in a solution containing the detergent, typically by weight of the total composition, from about 0.0001% to about 0.05%, or even from about 0.001% to about 0.01%.

Granular detergent compositions of the present invention may include any number of conventional detergent ingredients. For example, the surfactant system of the detergent composition may include anionic, nonionic, zwitterionic, ampholytic and cationic classes and compatible mixtures thereof. Detergent surfactants for granular compositions are described in U.S. Pat. No. 3,664,961, Norris, issued May 23, 1972, and in U.S. Pat. No. 3,919,678, Laughlin et al., issued Dec. 30, 1975. Cationic surfactants include those described in U.S. Pat. No. 4,222,905, Cockrell, issued Sep. 16, 1980, and in U.S. Pat. No. 4,239,659, Murphy, issued Dec. 16, 1980.

Nonlimiting examples of surfactant systems include the conventional $C_{11}$-$C_{18}$ alkyl benzene sulfonates ("LAS") and primary, branched-chain and random $C_{10}$-$C_{20}$ alkyl sulfates ("AS"), the $C_{10}$-$C_{18}$ secondary (2,3) alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulfates such as oleyl sulfate, the $C_{10}$-$C_{18}$ alkyl alkoxy sulfates ("$AE_xS$"; especially EO 1-7 ethoxy sulfates), $C_{10}$-$C_{18}$ alkyl alkoxy carboxylates (especially the EO 1-5 ethoxycarboxylates), the $C_{10-18}$ glycerol ethers, the $C_{10}$-$C_{18}$ alkyl polyglycosides and their corresponding sulfated polyglycosides, and $C_{12}$-$C_{18}$ alpha-sulfonated fatty acid esters. If desired, the conventional nonionic and amphoteric surfactants such as the $C_{12}$-$C_{18}$ alkyl ethoxylates ("AE") including the so-called narrow peaked alkyl ethoxylates and $C_6$-$C_{12}$ alkyl phenol alkoxylates (especially ethoxylates and mixed ethoxy/propoxy), $C_{12}$-$C_{18}$ betaines and sulfobetaines ("sultaines"), $C_{10}$-$C_{18}$ amine oxides, and the like, can also be included in the surfactant system. The $C_{10}$-$C_{18}$ N-alkyl polyhydroxy fatty acid amides can also be used. See WO 9,206,154. Other sugar-derived surfactants include the N-alkoxy polyhydroxy fatty acid amides, such as $C_{10}$-$C_{18}$ N-(3-methoxypropyl)glucamide. The N-propyl through N-hexyl $C_{12}$-$C_{18}$ glucamides can be used for low sudsing. $C_{10}$-$C_{20}$ conventional soaps may also be used. If high sudsing is desired, the branched-chain $C_{10}$-$C_{16}$ soaps may be used. Mixtures of anionic and nonionic surfactants are especially useful. Other conventional useful surfactants are listed in standard texts.

The detergent composition can, and preferably does, include a detergent builder. Builders are generally selected from the various water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates. Preferred are the alkali metal, especially sodium, salts of the above. Preferred for use herein are the phosphates, carbonates, silicates, $C_{10-18}$ fatty acids, polycarboxylates, and mixtures thereof. More preferred are sodium tripolyphosphate, tetrasodium pyrophosphate, citrate, tartrate mono- and di-succinates, sodium silicate, and mixtures thereof.

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1, 1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148. Examples of nonphosphorus, inorganic builders are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehl, issued Mar. 7, 1967. Such materials include the water-soluble salts of homo- and copolymers of aliphatic carboxylic acids such as maleic acid, itaconic acid, mesaconic acid, fumaric acid, aconitic acid, citraconic acid and methylenemalonic acid. Some of these materials are useful as the water-soluble anionic polymer as hereinafter described, but only if in intimate admixture with the nonsoap anionic surfactant. Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al.

Water-soluble silicate solids represented by the formula $SiO_2.M_2O$, M being an alkali metal, and having a $SiO_2:M_2O$ weight ratio of from about 0.5 to about 4.0, are useful salts in the detergent granules of the invention at levels of from about 2% to about 15% on an anhydrous weight basis. Anhydrous or hydrated particulate silicate can be utilized, as well.

Any number of additional ingredients can also be included as components in the granular detergent composition. These include other detergency builders, bleaches, bleach activators, suds boosters or suds suppressors, anti-tarnish and anti-corrosion agents, soil suspending agents, soil release agents, germicides, pH adjusting agents, nonbuilder alkalinity sources, chelating agents, smectite clays, enzymes, enzyme-stabilizing agents and perfumes. See U.S. Pat. No. 3,936,537, issued Feb. 3, 1976 to Baskerville, Jr. et al.

Bleaching agents and activators are described in U.S. Pat. No. 4,412,934, Chung et al., issued Nov. 1, 1983, and in U.S. Pat. No. 4,483,781, Hartman, issued Nov. 20, 1984. Chelating agents are also described in U.S. Pat. No. 4,663,071, Bush et al., from Column 17, line 54 through Column 18, line 68. Suds modifiers are also optional ingredients and are described in U.S. Pat. No. 3,933,672, issued Jan. 20, 1976 to Bartoletta et al., and U.S. Pat. No. 4,136,045, issued Jan. 23, 1979 to Gault et al. Suitable smectite clays for use herein are described in U.S. Pat. No. 4,762,645, Tucker et al., issued Aug. 9, 1988, Column 6, line 3 through Column 7, line 24. Suitable additional detergency builders for use herein are enumerated in the Baskerville patent, Column 13, line 54 through Column 16, line 16, and in U.S. Pat. No. 4,663,071, Bush et al., issued May 5, 1987.

Rinse Added Fabric Conditioning Compositions

In one aspect, the laundry care compositions disclosed herein, may take the form of rinse added fabric conditioning compositions. Such compositions may comprise a fabric softening active and a sufficient amount of suitable thiazolium dye, that is described under the heading "Suitable Thiazolium Dyes" of the present specification, to provide a tinting effect to fabric treated by the composition, typically from about 0.00001 wt. % (0.1 ppm) to about 1 wt. % (10,000 ppm), or even from about 0.0003 wt. % (3 ppm) to about 0.03 wt. % (300 ppm) based on total rinse added fabric conditioning composition weight. In another specific embodiment, the compositions are rinse added fabric conditioning compositions. Examples of typical rinse added conditioning composition can be found in U.S. Provisional Patent Application Ser. No. 60/687,582 filed on Oct. 8, 2004.

In one embodiment of the invention, the fabric softening active (hereinafter "FSA") is a quaternary ammonium compound suitable for softening fabric in a rinse step. In one embodiment, the FSA is formed from a reaction product of a fatty acid and an aminoalcohol obtaining mixtures of mono-, di-, and, in one embodiment, triester compounds. In another embodiment, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain embodiments of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

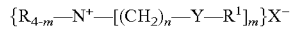

wherein each R substituent is either hydrogen, a short chain $C_1$-$C_6$, preferably $C_1$-$C_3$ alkyl or hydroxyalkyl group, e.g., methyl (most preferred), ethyl, propyl, hydroxyethyl, and the like, poly ($C_2$-$C_3$ alkoxy), preferably polyethoxy, group, benzyl, or mixtures thereof; each m is 2 or 3; each n is from 1 to about 4, preferably 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, preferably $C_{14}$-$C_{20}$, with each $R^1$ being a hydrocarbyl, or substituted hydrocarbyl group; it is acceptable for $R^1$ to be unsaturated or saturated and branched or linear and preferably it is linear; it is acceptable for each $R^1$ to be the same or different and preferably these are the same; and $X^-$ can be any softener-compatible anion, preferably, chloride, bromide, methylsulfate, ethylsulfate, sulfate, phosphate, and nitrate, more preferably chloride or methyl sulfate. Preferred DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyloxyethyl)-N,N-methylhydroxyethylammonium methylsulfate wherein the acyl group is derived from animal fats, unsaturated, and polyunsaturated, fatty acids, e.g., tallow, hardended tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc. Non-limiting examples of suitable fatty acids are listed in U.S. Pat. No. 5,759,990 at column 4, lines 45-66. In one embodiment the FSA comprises other actives in addition to DQA (1) or DQA. In yet another embodiment, the FSA comprises only DQA (1) or DQA and is free or essentially free of any other quaternary ammonium compounds or other actives. In yet another embodiment, the FSA comprises the precursor amine that is used to produce the DQA.

In another aspect of the invention, the FSA comprises a compound, identified as DTTMAC comprising the formula:

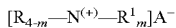

wherein each m is 2 or 3, each $R^1$ is a $C_6$-$C_{22}$, preferably $C_{14}$-$C_{20}$, but no more than one being less than about $C_{12}$ and then the other is at least about 16, hydrocarbyl, or substituted hydrocarbyl substituent, preferably $C_{10}$-$C_{20}$ alkyl or alkenyl (unsaturated alkyl, including polyunsaturated alkyl, also referred to sometimes as "alkylene"), most preferably $C_{12}$-$C_{18}$ alkyl or alkenyl, and branch or unbranched. In one embodiment, the Iodine Value (IV) of the FSA is from about 1 to 70; each R is H or a short chain $C_1$-$C_6$, preferably $C_1$-$C_3$ alkyl or hydroxyalkyl group, e.g., methyl (most preferred), ethyl, propyl, hydroxyethyl, and the like, benzyl, or ($R^2$O)$_{2-4}$H where each $R^2$ is a $C_1$-$C_6$ alkylene group; and $A^-$ is a softener compatible anion, preferably, chloride, bromide, methylsulfate, ethylsulfate, sulfate, phosphate, or nitrate; more preferably chloride or methyl sulfate. Examples of these FSAs include dialkydimethylammonium salts and dialkylenedimethylammonium salts such as ditallowdimethylammonium and ditallowdimethylammonium methylsulfate. Examples of commercially available dialkylenedimethylammonium salts usable in the present invention are di-hydrogenated tallow dimethyl ammonium chloride and ditallowdimethyl ammonium chloride available from Degussa under the trade names Adogen® 442 and Adogen® 470 respectively. In one embodiment the FSA comprises other actives in addition to DTTMAC. In yet another embodiment, the FSA comprises only compounds of the DTTMAC and is free or essentially free of any other quaternary ammonium compounds or other actives.

In one embodiment, the FSA comprises an FSA described in U.S. Pat. Pub. No. 2004/0204337 A1, published Oct. 14, 2004 to Corona et al., from paragraphs 30-79.

In another embodiment, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one embodiment, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one embodiment, the FSA may also include amide containing compound compositions. Examples of diamide comprising compounds may include but not limited to methyl-bis (tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another specific embodiment of the invention provides for a rinse added fabric care composition further comprising a cationic starch. Cationic starches are disclosed in US 2004/0204337 A1. In one embodiment, the fabric care composition comprises from about 0.1% to about 7% of cationic starch by weight of the laundry care composition. In one embodiment, the cationic starch is HCP401 from National Starch.

Suitable Thiazolium Dyes

Suitable thiazolium dyes include azo dyes that may have Formula (I) below:

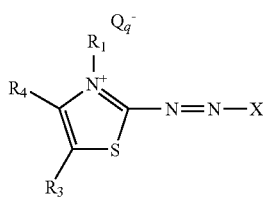

Formula I wherein:
$R_3$ and $R_4$ may be identical or different and, independently of one another, are hydrogen, a saturated or unsaturated $(C_1\text{-}C_{22})$-alkyl group, a $(C_1\text{-}C_{22})$-alkyl group substituted by a halogen atom, a hydroxy-$(C_2\text{-}C_{22})$-alkyl group optionally interrupted by oxygen, a polyether group derived from ethylene oxide, propylene oxide or butylene oxide, an amino-$(C_1\text{-}C_{22})$-alkyl group, a substituted or unsubstituted phenyl group or a benzyl group, a $(C_1\text{-}C_{22})$-alkyl group terminated in sulfonate, sulfate, or carboxylate, or the radical groups $R_3$ and $R_4$, together with the remaining molecule, can form a heterocyclic or carbocyclic, saturated or unsaturated, substituted or unsubstituted ring system optionally substituted by halogen, sulfate, sulfonate, phosphate, nitrate, and carboxylate;

X may be a radical group of the phenol series or a heterocyclic radical group or aniline series or m-toluidine series that may have Formula II below;

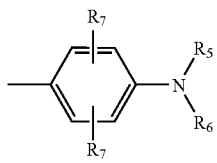

Formula II wherein:
$R_5$ and $R_6$ may be identical or different and, independently of one another, are a straight or branched saturated or unsaturated $(C_1\text{-}C_{22})$-alkyl group, a $(C_1\text{-}C_{22})$-alkyl ether group, a hydroxy-$(C_2\text{-}C_{22})$-alkyl group optionally interrupted by oxygen, a polyether group derived from ethylene oxide, propylene oxide, butylene oxide, glycidyl or combinations thereof, an amino-$(C_1\text{-}C_{22})$-alkyl group, a substituted or unsubstituted phenyl group or a benzyl group, a linear or branched $(C_1\text{-}C_{22})$-alkyl group terminated in a linear or branched $(C_1\text{-}C_{22})$-alkyl, hydroxyl, acetate, sulfonate, sulfate, or carboxylate, group or $R_5$ and $R_6$ or $R_5$ and $R_7$ or $R_6$ and $R_7$, together with the nitrogen atom, form a 5-membered to 6-membered ring system, which may comprise a further heteroatom;

or $R_5$ and $R_6$ or $R_5$ and $R_7$ or $R_6$ and $R_7$, form with a carbon atom of the benzene ring an optionally oxygen-containing or nitrogen containing five or six-membered heterocycle which may be substituted with one or more $(C_1\text{-}C_{22})$-alkyl group;

$R_7$ may be identical or different and, independently of one another, are hydrogen, a halogen atom, a saturated or unsaturated $(C_1\text{-}C_{22})$-alkyl group, a $(C_1\text{-}C_{22})$-alkyl ether group, a hydroxyl group, a hydroxy-$(C_1\text{-}C_{22})$-alkyl group, a $(C_1\text{-}C_{22})$-alkoxy group, a cyano group, a nitro group, an amino group, a $(C_1\text{-}C_{22})$-alkylamino group, a $(C_1\text{-}C_{22})$-dialkylamino group, a carboxylic acid group, a C(O)O—$(C_1\text{-}C_{22})$-alkyl group, a substituted or unsubstituted C(O)O-phenyl group;

$Q^-$ may be an anion that balances the overall charge of the compound of Formula I, and the index q may be either 0 or 1. Suitable anions include chloro, bromo, methosulfate, tetrafluoroborate, and acetate anions.

$R_1$ may be a $(C_1\text{-}C_{22})$-alkyl, an alkyl aromatic or an alkyl sulfonate radical having Formula (III) below;

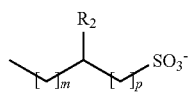

Formula III wherein
$R_2$ is hydrogen, methyl, ethyl, propyl, acetate or a hydroxyl group;
m and p are integers from 0 to (n−1), n is an integer from 1 to 6 and m+p=(n−1);

with the proviso that the heterocycle of the Formula (I) comprises at least two and at most three heteroatoms, where the heterocycle has at most one sulfur atom;

In one aspect, a suitable thiazolium dye may have Formula IV below:

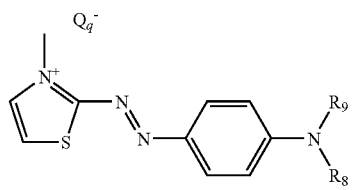

Formula IV wherein $R_8$ and $R_9$ may be identical or different and, independently of one another, may be a saturated or unsaturated $(C_1\text{-}C_{22})$-alkyl group, a $(C_1\text{-}C_{22})$-alkyl group, a hydroxy-$(C_2\text{-}C_{22})$-alkyl group optionally interrupted by oxygen, a polyether group derived from ethylene oxide, propylene oxide or butylene oxide, an amino-$(C_1\text{-}C_{22})$-alkyl group, a substituted or unsubstituted phenyl group or a benzyl group, a $(C_1\text{-}C_{22})$-alkyl group terminated in sulfonate, sulfate, or carboxylate, or $R_8$ and $R_9$, together with the nitrogen atom, may form a 5-membered to 6-membered ring system, which may comprise a further heteroatom; or $R_8$ or $R_9$ may form, with a carbon atom of the benzene ring, an optionally oxygen-containing or nitrogen containing five or six-membered heterocycle which may be substituted with one or more $(C_1\text{-}C_{22})$- alkyl groups, and mixtures thereof, and $R_{10}$ is hydrogen or methyl. For Formula IV, $Q^-$ is as described for Formula I above.

In one aspect, suitable thiazolium dyes may have Formula (V):

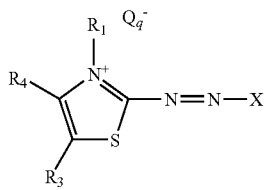

Formula V wherein:

a.) $R_1$ may be selected from a branched or unbranched $(C_1-C_{22})$-alkyl moiety, an aromatic alkyl moiety, a polyalkylene oxide moiety, or a moiety having Formula (VI) below;

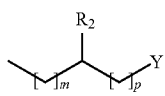

Formula VI wherein (i) $R_2$ may be selected from hydrogen, methyl, ethyl, propyl, acetate or a hydroxyl moiety; m and p may be, independently, integers from 0 to (n–1), with the proviso that n is an integer from 1 to 6 and m+p=(n–1)

(ii) Y may be selected from a hydroxyl, sulfonate, sulfate, carboxylate or acetate moiety;

b.) $R_3$ and $R_4$:

i.) may be independently selected from hydrogen; a saturated or unsaturated $(C_1-C_{22})$-alkyl moiety; a hydroxy-$(C_2-C_{22})$-alkyl moiety; a hydroxy-$(C_2-C_{22})$-alkyl moiety comprising, in addition to the hydroxyl oxygen, an oxygen atom; a polyether moiety; an amino-$(C_1-C_{22})$-alkyl moiety; a substituted or unsubstituted phenyl moiety; a substituted or unsubstituted benzyl moiety; a $(C_1-C_{22})$-alkyl moiety terminated in sulfonate, sulfate, acetate, or carboxylate; or ii.) when taken together may form a saturated or unsaturated heterocyclic or carbocyclic moiety; or iii.) when taken together may form a saturated or unsaturated heterocyclic or carbocyclic moiety substituted by, sulfate, sulfonate, phosphate, nitrate, and carboxylate;

c.) X may be moiety having Formula VII below;

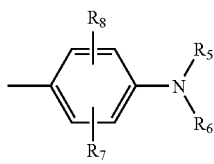

Formula VII wherein:

i.) $R_5$ and $R_6$:

(a) may be independently selected from hydrogen; a saturated or unsaturated $(C_1-C_{22})$-alkyl moiety; a hydroxy-$(C_2-C_{22})$-alkyl moiety; a hydroxy-$(C_2-C_{22})$-alkyl moiety comprising, in addition to the hydroxyl oxygen, an oxygen atom; a capped or uncapped polyether moiety; an amino-$(C_1-C_{22})$-alkyl moiety; a substituted or unsubstituted phenyl moiety; a substituted or unsubstituted benzyl moiety; a $(C_1-C_{22})$-alkyl moiety comprising a terminating $C_1-C_4$ alkyl ether, sulfonate, sulfate, acetate or carboxylate moiety; a thiazole moiety or (b) when taken together may form a saturated or unsaturated heterocyclic moiety; or (c) when taken together form a saturated or unsaturated heterocyclic moiety substituted by one or more, alkoxylate, sulfate, sulfonate, phosphate, nitrate, and/or carboxylate moieties;

(d) when taken together with $R_7$, $R_8$, or $R_7$ and $R_8$ form one or more saturated or unsaturated heterocyclic moieties, optionally substituted by one or more alkoxylate, sulfate, sulfonate, phosphate, nitrate, and/or carboxylate moieties; or (e) when taken together form a thiazole moiety;

ii.) $R_7$ and $R_8$ may be independently selected from hydrogen or a saturated or unsaturated alkyl moiety;

d.) $Q^-$ may be an anion that balances the overall charge of the compound of Formula I, and the index q is 0 or 1. Suitable anions include chloro, bromo, methosulfate, tetrafluoroborate, and acetate anions.

In one aspect, for Formula V:

a.) $R_1$ may be a methyl moiety;

b.) $R_3$ and $R_4$ may be hydrogen; and c.) X may have Formula VIII below:

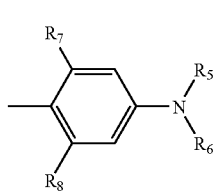

Formula VIII wherein (i) $R_5$ and $R_6$ may be as defined for Formula VII above;

(ii) $R_7$ may be hydrogen or a methyl moiety; and (iii) $R_8$ may be hydrogen.

In one aspect, for Formula VII $R_5$ and $R_6$ each comprise, independently, from 1 to 20 alkylene oxide units and, independently, a moiety selected from the group consisting of: styrene oxide, glycidyl methyl ether, isobutyl glycidyl ether, isopropylglycidyl ether, t-butyl glycidyl ether, 2-ethylhexylgycidyl ether, or glycidylhexadecyl ether.

In one aspect, suitable thiazolium dyes are set forth in Table 1 below and are defined as Table 1 Thiazolium Dyes. The chemical names, as determined by ChemFinder software Level:Pro; Version 9.0 available from CambridgeSoft, Cambridge, Mass., U.S.A., for such dyes are respectively provided in Table 2 below. Such dyes are associated, as needed to balance the molecule's charge, with an anion $Q^-$. Such anion is not shown in the structures below but for the purposes of the present specification is assumed to be present as required. Such anion is as described above for Formula (I).

TABLE 1

| No. | Structure |
|-----|-----------|
| 1 | (3-methylthiazol-3-ium-2-yl)-N=N-(4-(N-benzyl-N-methylamino)phenyl) |
| 2 | (4-(dimethylamino)phenyl)-N=N-(3-methylthiazol-3-ium-2-yl) |
| 3 | (3-methylthiazol-3-ium-2-yl)-N=N-(4-(N,N-bis(2-hydroxyethyl)amino)phenyl) |
| 4 | (3-methylthiazol-3-ium-2-yl)-N=N-(4-(N,N-bis(EO₃)amino)phenyl) |
| 5 | (3-methylthiazol-3-ium-2-yl)-N=N-(4-(N,N-bis(EO₂)amino)phenyl) |
| 6 | (3-methylthiazol-3-ium-2-yl)-N=N-(4-(N,N-bis(EO₁PO₄)amino)phenyl) |
| 7 | (3-methylthiazol-3-ium-2-yl)-N=N-(4-(N,N-bis(EO₁PO₃)amino)phenyl) |
| 8 | (3-methylthiazol-3-ium-2-yl)-N=N-(4-(N,N-bis(EO₁PO₂)amino)phenyl) |

TABLE 1-continued

| No. | Structure |
|---|---|
| 9 | |
| 10 | |
| 11 | |
| 12 | |
| 13 | |
| 14 | |

TABLE 1-continued
| No. | Structure |
|---|---|
| 15 | 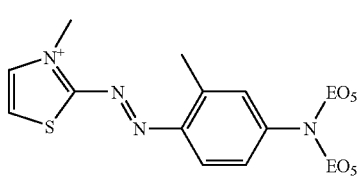 |
| 16 | 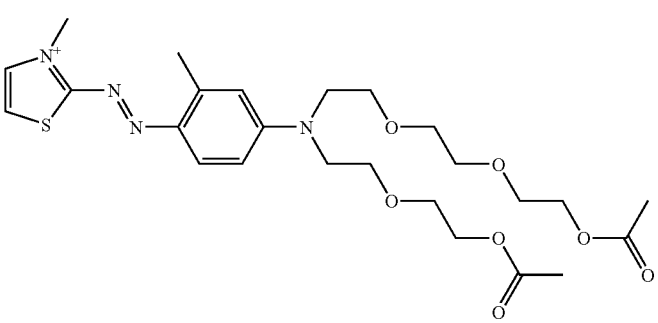 |
| 17 | 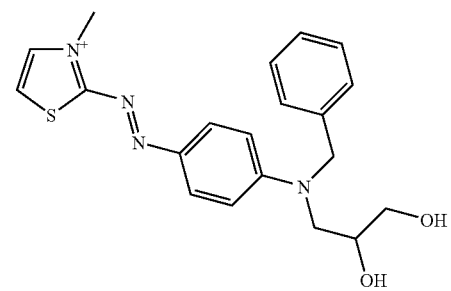 |
| 18 | 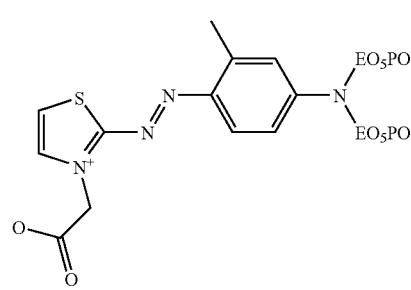 |
| 19 | 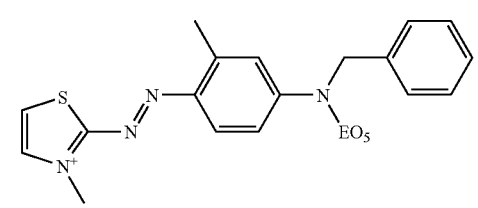 |
| 20 | 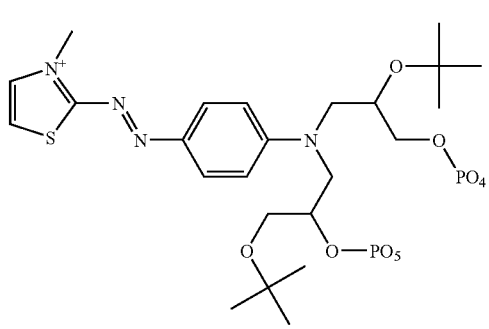 |

TABLE 1-continued

| No. | Structure |
|---|---|
| 21 | |
| 22 | |
| 23 | |
| 24 | |
| 25 | |

TABLE 1-continued
| No. | Structure |
|---|---|
| 26 | 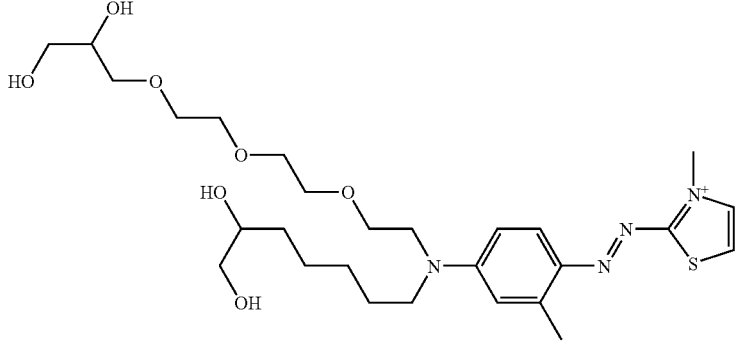 |
| 27 | 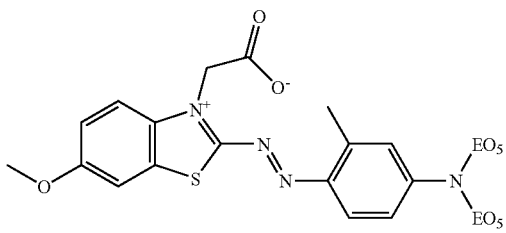 |
| 28 | 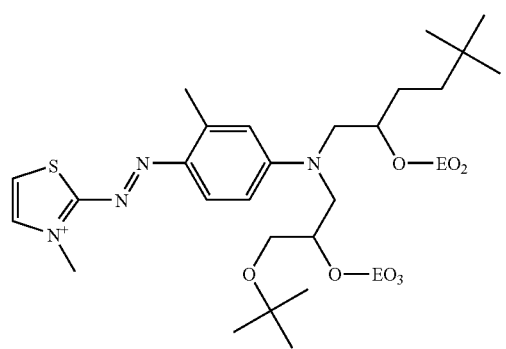 |
| 29 | 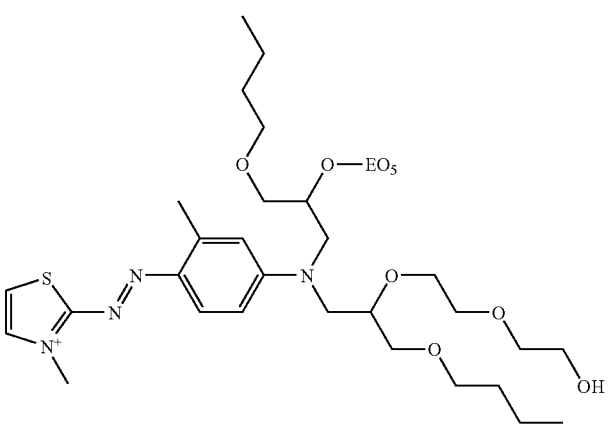 |

TABLE 1-continued
| No. | Structure |
|---|---|
| 30 | 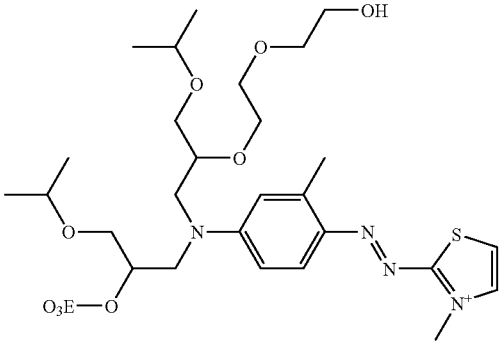 |
| 31 | 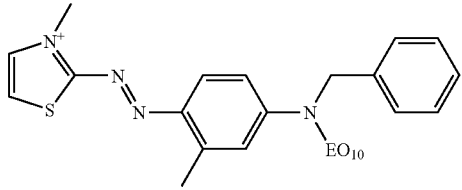 |
| 32 | 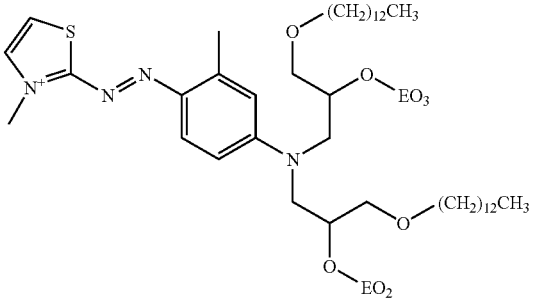 |
| 33 | 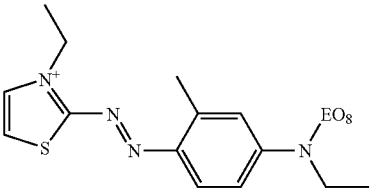 |
| 34 | 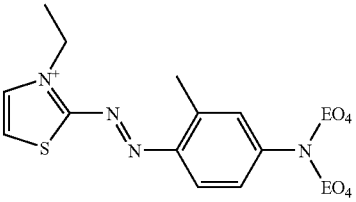 |
| 35 | 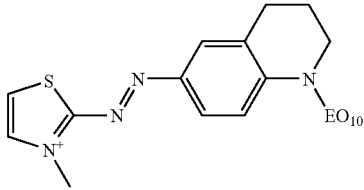 |

TABLE 1-continued
| No. | Structure |
|-----|-----------|
| 36 | 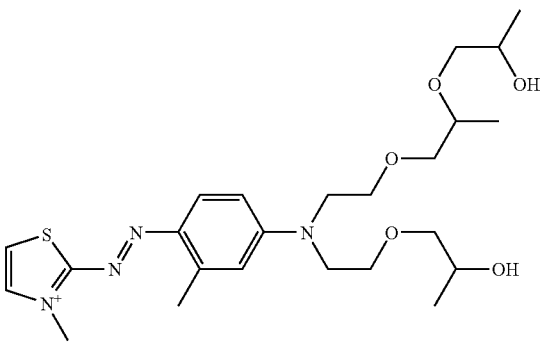 |
| 37 | 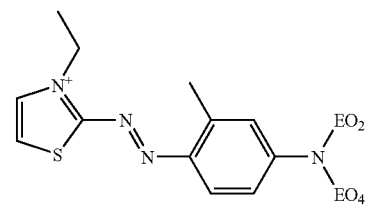 |
| 38 | 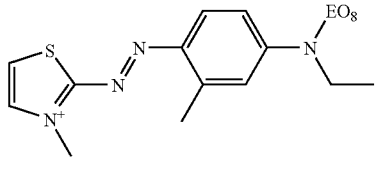 |
| 39 | 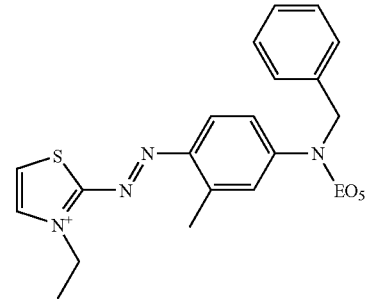 |
| 40 | 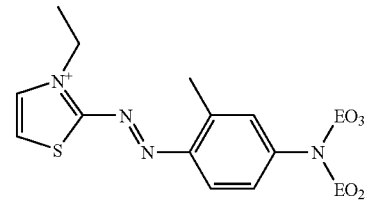 |
| 41 | 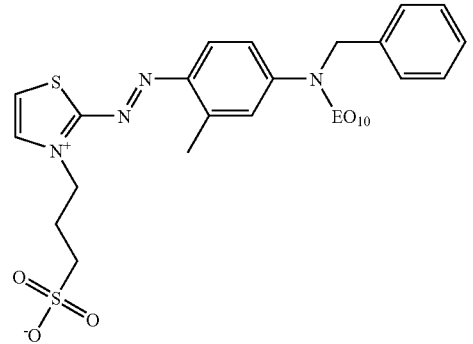 |

TABLE 1-continued

| No. | Structure |
|---|---|
| 42 | |
| 43 | |
| 44 | |
| 45 | |

TABLE 1-continued
| No. | Structure |
|---|---|
| 46 | 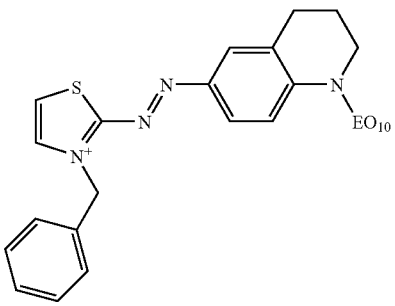 |
| 47 | 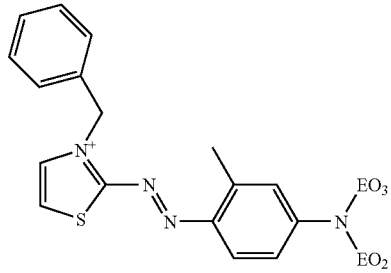 |
| 48 | 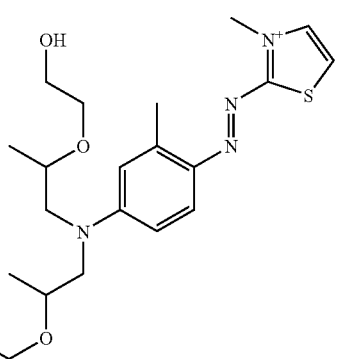 |
| 49 | 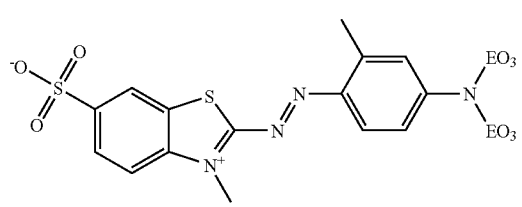 |
| 50 | 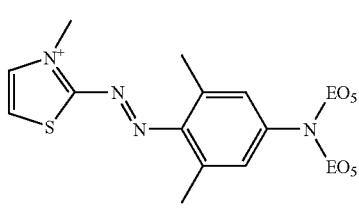 |
| 51 | 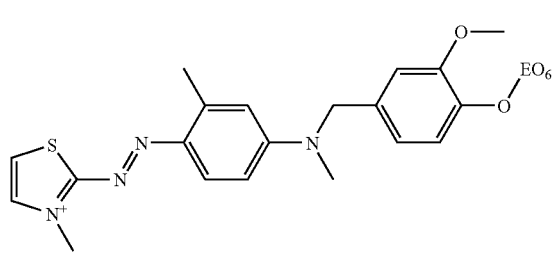 |

TABLE 1-continued

| No. | Structure |
|-----|-----------|
| 52  |           |
| 53  |           |
| 54  |           |
| 55  |           |
| 56  |           |
| 57  |           |

TABLE 1-continued
| No. | Structure |
|---|---|
| 58 | 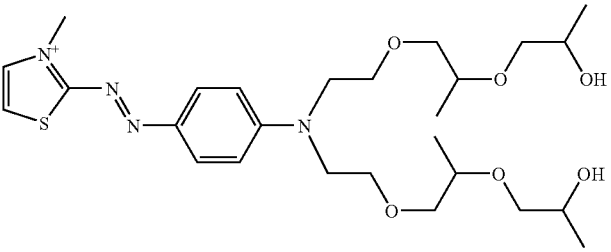 |
| 59 | 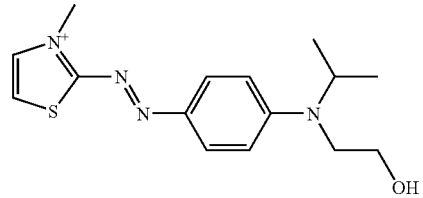 |
| 60 | 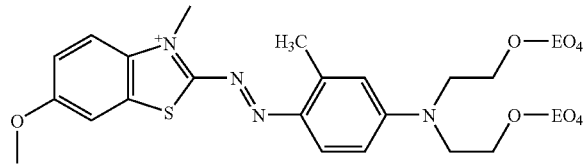 |
| 61 | 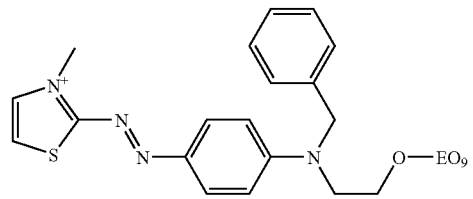 |
| 62 | 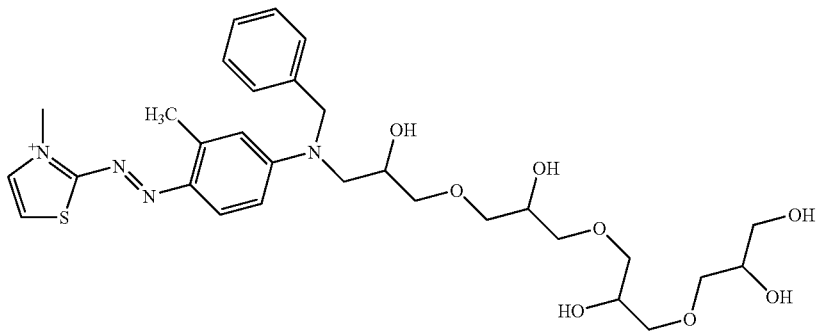 |
| 63 | 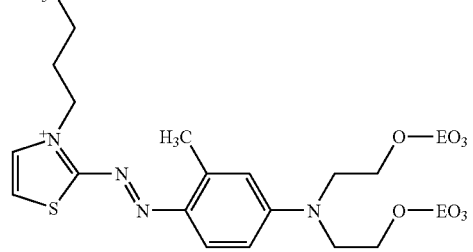 |

TABLE 1-continued

| No. | Structure |
|-----|-----------|
| 64  |           |
| 65  |           |
| 66  |           |
| 67  |           |
| 68  |           |
| 69  |           |
| 70  |           |

TABLE 1-continued

| No. | Structure |
|-----|-----------|
| 71  |           |
| 72  |           |
| 73  |           |
| 74  |           |
| 75  |           |
| 76  |           |
| 77  |           |

TABLE 1-continued

| No. | Structure |
|-----|-----------|
| 78  |           |
| 79  |           |
| 80  |           |

TABLE 2

| No. | Name |
|-----|------|
| 1 | (E)-2-((4-(benzyl(methyl)amino)phenyl)diazenyl)-3-methylthiazol-3-ium |
| 2 | (E)-2-((4-(dimethylamino)phenyl)diazenyl)-3-methylthiazol-3-ium |
| 3 | (E)-2-((4-(bis(2-hydroxyethyl)amino)phenyl)diazenyl)-3-methylthiazol-3-ium |
| 4 | (E)-2-((4-(bis(2-(2-(2-hydroxyethoxy)ethoxy)ethyl)amino)phenyl)diazenyl)-3-methylthiazol-3-ium |
| 5 | (E)-2-((4-(bis(2-(2-hydroxyethoxy)ethyl)amino)phenyl)diazenyl)-3-methylthiazol-3-ium |
| 6 | (E)-2-((4-(bis(14-hydroxy-5,8,11-trimethyl-3,6,9,12-tetraoxapentadecyl)amino)phenyl)diazenyl)-3-methylthiazol-3-ium |
| 7 | (E)-2-((4-(bis(2-(2-(2-(2-hydroxypropoxy)propoxy)propoxy)ethyl)amino)phenyl)diazenyl)-3-methylthiazol-3-ium |
| 8 | (E)-2-((4-(bis(2-(2-(2-hydroxypropoxy)propoxy)ethyl)amino)phenyl)diazenyl)-3-methylthiazol-3-ium |
| 9 | (E)-2-((4-(bis(35-hydroxy-5,8,11,14,17,20,23-heptamethyl-3,6,9,12,15,18,21,24,27,30,33-undecaoxapentatriacontyl)amino)-2-methylphenyl)diazenyl)-3-methylthiazol-3-ium |
| 10 | (E)-2-((4-(bis(3-(2,3-dihydroxypropoxy)-2-hydroxypropyl)amino)-2-methylphenyl)diazenyl)-3-methylthiazol-3-ium |
| 11 | (E)-2-((4-(bis(2,3-dihydroxypropyl)amino)-2-methylphenyl)diazenyl)-3-methylthiazol-3-ium |
| 12 | (E)-2-((4-((2-hydroxy-3-(2-(2-(2-hydroxyethoxy)ethoxy)ethoxy)propyl)(2-hydroxy-3-(2-(2-hydroxyethoxy)ethoxy)propyl)amino)-2-methylphenyl)diazenyl)-3-methylthiazol-3-ium |

TABLE 2-continued

| No. | Name |
|---|---|
| 13 | (E)-2-((4-((2-(2-(2-hydroxyethoxy)ethoxy)ethyl)(2-(2-hydroxyethoxy)ethyl)amino)-2-methylphenyl)diazenyl)-3-methylthiazol-3-ium |
| 14 | (E)-2-((4-(bis(35-hydroxy-17,20,23,26,29,32-hexamethyl-3,6,9,12,15,18,21,24,27,30,33-undecaoxahexatriacontyl)amino)-2-methylphenyl)diazenyl)-3-methylthiazol-3-ium |
| 15 | (E)-2-((4-(bis(14-hydroxy-3,6,9,12-tetraoxatetradecyl)amino)-2-methylphenyl)diazenyl)-3-methylthiazol-3-ium |
| 16 | (E)-2-((4-((2-(2-(2-acetoxyethoxy)ethoxy)ethyl)(2-(2-acetoxyethoxy)ethyl)amino)-2-methylphenyl)diazenyl)-3-methylthiazol-3-ium |
| 17 | (E)-2-((4-(benzyl(2,3-dihydroxypropyl)amino)phenyl)diazenyl)-3-methylthiazol-3-ium |
| 18 | (E)-2-(2-((4-(bis(35-hydroxy-17,20,23,26,29,32-hexamethyl-3,6,9,12,15,18,21,24,27,30,33-undecaoxahexatriacontyl)amino)-2-methylphenyl)diazenyl)thiazol-3-ium-3-yl)acetate |
| 19 | (E)-2-((4-(benzyl(14-hydroxy-3,6,9,12-tetraoxatetradecyl)amino)-2-methylphenyl)diazenyl)-3-methylthiazol-3-ium |
| 20 | (E)-2-((4-((2-tert-butoxy-15-hydroxy-6,9,12-trimethyl-4,7,10,13-tetraoxahexadecyl)(2-(tert-butoxymethyl)-17-hydroxy-5,8,11,14-tetramethyl-3,6,9,12,15-pentaoxaoctadecyl)amino)phenyl)diazenyl)-3-methylthiazol-3-ium |
| 21 | (E)-2-((4-(benzyl(29-hydroxy-3,6,9,12,15,18,21,24,27-nonaoxanonacosyl)amino)phenyl)diazenyl)-3-methylthiazol-3-ium |
| 22 | (E)-2-((4-(bis(14-hydroxy-3,6,9,12-tetraoxatetradecyl)amino)-2-methylphenyl)diazenyl)-5-methoxy-3-methylbenzo[d]thiazol-3-ium |
| 23 | (E)-2-(2-((4-((2-(2-(2-hydroxyethoxy)ethoxy)ethyl)(2-(2-hydroxyethoxy)ethyl)amino)-2-methylphenyl)diazenyl)thiazol-3-ium-3-yl)acetate |
| 24 | (E)-2-((4-(ethyl(14-hydroxy-3,6,9,12-tetraoxatetradecyl)amino)-2-methylphenyl)diazenyl)-3-methylthiazol-3-ium |
| 25 | (E)-2-((4-(benzyl(1,17-dihydroxy-3,6,9,12,15-pentaoxaoctadecan-18-yl)amino)-2-methylphenyl)diazenyl)-3-methylthiazol-3-ium |
| 26 | (E)-2-((4-((2-(2-(2-(2,3-dihydroxypropoxy)ethoxy)ethoxy)ethyl)(2-(2-(2,3-dihydroxypropoxy)ethoxy)ethyl)amino)-2-methylphenyl)diazenyl)-3-methylthiazol-3-ium |
| 27 | (E)-2-(2-((4-(bis(14-hydroxy-3,6,9,12-tetraoxatetradecyl)amino)-2-methylphenyl)diazenyl)-6-methoxybenzo[d]thiazol-3-ium-3-yl)acetate |
| 28 | (E)-2-((4-((3-tert-butoxy-2-(2-(2-(2-hydroxyethoxy)ethoxy)ethoxy)propyl)(3-tert-butoxy-2-(2-(2-hydroxyethoxy)ethoxy)propyl)amino)-2-methylphenyl)diazenyl)-3-methylthiazol-3-ium |
| 29 | (E)-2-((4-((3-butoxy-2-(2-(2-(2-hydroxyethoxy)ethoxy)ethoxy)propyl)(3-butoxy-2-(2-(2-hydroxyethoxy)ethoxy)propyl)amino)-2-methylphenyl)diazenyl)-3-methylthiazol-3-ium |
| 30 | (E)-2-((4-((2-(2-(2-hydroxyethoxy)ethoxy)-3-isopropoxypropyl)(2-(2-(2-(2-hydroxyethoxy)ethoxy)ethoxy)-3-isopropoxypropyl)amino)-2-methylphenyl)diazenyl)-3-methylthiazol-3-ium |
| 31 | (E)-2-((4-(benzyl(29-hydroxy-3,6,9,12,15,18,21,24,27-nonaoxanonacosyl)amino)-2-methylphenyl)diazenyl)-3-methylthiazol-3-ium |
| 32 | (E)-2-((4-((2-(2-(2-hydroxyethoxy)ethoxy)-3-(tridecyloxy)propyl)(2-(2-(2-hydroxyethoxy)ethoxy)ethoxy)-3-(tridecyloxy)propyl)amino)-2-methylphenyl)diazenyl)-3-methylthiazol-3-ium |
| 33 | (E)-3-ethyl-2-((4-(ethyl(23-hydroxy-3,6,9,12,15,18,21-heptaoxatricosyl)amino)-2-methylphenyl)diazenyl)thiazol-3-ium |
| 34 | (E)-2-((4-(bis(2-(2-(2-(2-hydroxyethoxy)ethoxy)ethoxy)ethyl)amino)-2-methylphenyl)diazenyl)-3-ethylthiazol-3-ium |
| 35 | (E)-2-((1-(29-hydroxy-3,6,9,12,15,18,21,24,27-nonaoxanonacosyl)-1,2,3,4-tetrahydroquinolin-6-yl)diazenyl)-3-methylthiazol-3-ium |
| 36 | (E)-2-((4-((2-(2-hydroxypropoxy)ethyl)(2-(2-(2-hydroxypropoxy)propoxy)ethyl)amino)-2-methylphenyl)diazenyl)-3-methylthiazol-3-ium |
| 37 | (E)-2-((4-(bis(2-(2-(2-hydroxyethoxy)ethoxy)ethyl)amino)-2-methylphenyl)diazenyl)-3-ethylthiazol-3-ium |
| 38 | (E)-2-((4-(ethyl(23-hydroxy-3,6,9,12,15,18,21-heptaoxatricosyl)amino)-2-methylphenyl)diazenyl)-3-methylthiazol-3-ium |
| 39 | (E)-2-((4-(benzyl(14-hydroxy-3,6,9,12-tetraoxatetradecyl)amino)-2-methylphenyl)diazenyl)-3-ethylthiazol-3-ium |
| 40 | (E)-3-ethyl-2-((4-((2-(2-(2-hydroxyethoxy)ethoxy)ethyl)(2-(2-hydroxyethoxy)ethyl)amino)-2-methylphenyl)diazenyl)thiazol-3-ium |
| 41 | (E)-3-(2-((4-(benzyl(29-hydroxy-3,6,9,12,15,18,21,24,27-nonaoxanonacosyl)amino)-2-methylphenyl)diazenyl)thiazol-3-ium-3-yl)propane-1-sulfonate |
| 42 | (E)-4-(2-((4-(benzyl(29-hydroxy-3,6,9,12,15,18,21,24,27-nonaoxanonacosyl)amino)-2-methylphenyl)diazenyl)thiazol-3-ium-3-yl)butane-1-sulfonate |
| 43 | (E)-2-((4-(bis(2-(2-(2-hydroxyethoxy)ethoxy)ethyl)amino)-2-methylphenyl)diazenyl)-3-ethylthiazol-3-ium |

TABLE 2-continued

| No. | Name |
|---|---|
| 44 | (E)-3-benzyl-2-((4-((2-(2-(2-hydroxyethoxy)ethoxy)ethyl)(2-(2-hydroxyethoxy)ethyl)amino)phenyl)diazenyl)thiazol-3-ium |
| 45 | (E)-3-ethyl-2-((4-((2-(2-hydroxypropoxy)ethyl)(2-(2-(2-hydroxypropoxy)propoxy)ethyl)amino)-2-methylphenyl)diazenyl)thiazol-3-ium |
| 46 | (E)-3-benzyl-2-((1-(29-hydroxy-3,6,9,12,15,18,21,24,27-nonaoxanonacosyl)-1,2,3,4-tetrahydroquinolin-6-yl)diazenyl)thiazol-3-ium |
| 47 | (E)-3-benzyl-2-((4-((2-(2-(2-hydroxyethoxy)ethoxy)ethyl)(2-(2-hydroxyethoxy)ethyl)amino)-2-methylphenyl)diazenyl)thiazol-3-ium |
| 48 | (E)-2-((4-((2-(2-(2-hydroxyethoxy)ethoxy)propyl)(2-(2-hydroxyethoxy)propyl)amino)-2-methylphenyl)diazenyl)-3-methylthiazol-3-ium |
| 49 | (E)-2-((4-(benzyl(29-hydroxy-3,6,9,12,15,18,21,24,27-nonaoxanonacosyl)amino)-2-methylphenyl)diazenyl)-3-methylthiazol-3-ium |
| 50 | (E)-2-((4-(bis(14-hydroxy-3,6,9,12-tetraoxatetradecyl)amino)-2,6-dimethylphenyl)diazenyl)-3-methylthiazol-3-ium |
| 51 | (E)-2-((4-((4-(17-hydroxy-3,6,9,12,15-pentaoxaheptadecyloxy)-3-methoxybenzyl)(methyl)amino)-2-methylphenyl)diazenyl)-3-methylthiazol-3-ium |
| 52 | (E)-2-((1-(1-hydroxy-2,5,8,11,14,17,20,23,26-nonaoxaoctacosan-28-yl)-1,2,3,4-tetrahydroquinolin-6-yl)diazenyl)-3-methylthiazol-3-ium |
| 53 | (E)-4-(2-((4-(dimethylamino)phenyl)diazenyl)thiazol-3-ium-3-yl)butane-1-sulfonate |
| 54 | (E)-4-(2-((4-(dimethylamino)phenyl)diazenyl)-5-methylthiazol-3-ium-3-yl)butane-1-sulfonate |
| 55 | (E)-2-((4-((2-hydroxyethyl)(methyl)amino)phenyl)diazenyl)-3-methylthiazol-3-ium |
| 56 | (E)-2-(methyl(4-((3-methylthiazol-3-ium-2-yl)diazenyl)phenyl)amino)ethyl sulfate |
| 57 | (E)-2-((4-(butyl(2-(2-hydroxyethoxy)ethyl)amino)phenyl)diazenyl)-3-methylthiazol-3-ium |
| 58 | (E)-2-((4-(bis(2-(2-(2-hydroxypropoxy)propoxy)ethyl)amino)phenyl)diazenyl)-3-methylthiazol-3-ium |
| 59 | (E)-2-((4-((2-hydroxyethyl)(isopropyl)amino)phenyl)diazenyl)-3-methylthiazol-3-ium |
| 60 | (E)-2-((4-((14-hydroxy-3,6,9,12-tetraoxatetradecyl)(1-hydroxy-3,6,9,13-tetraoxapentadecan-15-yl)amino)-2-methylphenyl)diazenyl)-6-methoxy-3-methylbenzo[d]thiazol-3-ium |
| 61 | (E)-2-((4-(benzyl(29-hydroxy-3,6,9,12,15,18,21,24,27-nonaoxanonacosyl)amino)phenyl)diazenyl)-3-methylthiazol-3-ium |
| 62 | (E)-2-((4-(benzyl(3-(3-(2,3-dihydroxypropoxy)-2-hydroxypropoxy)-2-hydroxypropoxy)-2-hydroxypropyl)amino)-2-methylphenyl)diazenyl)-3-methylthiazol-3-ium |
| 63 | (E)-3-(2-((4-(bis(2-(2-(2-hydroxyethoxy)ethoxy)ethyl)amino)-2-methylphenyl)diazenyl)thiazol-3-ium-3-yl)propane-1-sulfonate |
| 64 | (E)-2-((4-(bis(14-hydroxy-3,6,9,12-tetraoxatetradecyl)amino)-2,5-dimethylphenyl)diazenyl)-6-methoxy-3-methylbenzo[d]thiazol-3-ium |
| 65 | (E)-3-ethyl-2-((4-(ethyl(14-hydroxy-3,6,9,12-tetraoxatetradecyl)amino)-2-methylphenyl)diazenyl)thiazol-3-ium |
| 66 | (E)-3-ethyl-2-((1-(29-hydroxy-3,6,9,12,15,18,21,24,27-nonaoxanonacosyl)-1,2,3,4-tetrahydroquinolin-6-yl)diazenyl)thiazol-3-ium |
| 67 | (E)-3-ethyl-2-((1-(29-hydroxy-3,6,9,12,15,18,21,24,27-nonaoxanonacosyl)-1,2,3,4-tetrahydroquinolin-6-yl)diazenyl)thiazol-3-ium |
| 68 | (E)-2-((4-((2-(2-(2-hydroxyethoxy)ethoxy)ethyl)(2-(2-hydroxyethoxy)ethyl)amino)-2-methylphenyl)diazenyl)-3,5-dimethylthiazol-3-ium |
| 69 | (E)-3-ethyl-2-((4-((2-(2-(2-hydroxyethoxy)ethoxy)ethyl)(2-(2-hydroxyethoxy)ethyl)amino)-2-methylphenyl)diazenyl)-5-methylthiazol-3-ium |
| 70 | (E)-2-((4-((2-(2-(2-hydroxyethoxy)ethoxy)ethyl)(2-(2-hydroxyethoxy)ethyl)amino)-2-methylphenyl)diazenyl)-3,5-dimethylthiazol-3-ium |
| 71 | (E)-3-ethyl-2-((4-((2-(2-(2-hydroxyethoxy)ethoxy)ethyl)(2-(2-hydroxyethoxy)ethyl)amino)-2-methylphenyl)diazenyl)-5-methylthiazol-3-ium |
| 72 | (E)-2-((4-((2-(2-(2-hydroxyethoxy)ethoxy)ethyl)(2-(2-hydroxyethoxy)ethyl)amino)-2-methylphenyl)diazenyl)-3,5-dimethylthiazol-3-ium |
| 73 | 2-((E)-(4-((14-hydroxy-3,6,9,12-tetraoxatetradecyl)(17-hydroxy-3-(4-((E)-thiazol-2-yldiazenyl)phenyl)-6,9,12,15-tetraoxa-3-azaheptadecyl)amino)phenyl)diazenyl)-3-methylthiazol-3-ium |
| 74 | (E)-2-((4-((2-(2-(2-hydroxyethoxy)ethoxy)ethyl)(2-(2-hydroxyethoxy)ethyl)amino)-2-methylphenyl)diazenyl)-3-methyl-5-nitrothiazol-3-ium |
| 75 | (E)-2-((4-((2-(2-(2-hydroxyethoxy)ethoxy)ethyl)(2-(2-hydroxyethoxy)ethyl)amino)-2-methylphenyl)diazenyl)-3-methyl-5-nitrothiazol-3-ium |

TABLE 2-continued

| No. | Name |
|---|---|
| 76 | (E)-2-((4-((2-(2-(2-hydroxyethoxy)ethoxy)ethyl)(2-(2-hydroxyethoxy)ethyl)amino)-2-methylphenyl)diazenyl)-3-methylthiazol-3-ium-4-carboxylate |
| 77 | (E)-2-((4-((2-(2-(2-hydroxyethoxy)ethoxy)ethyl)(2-(2-hydroxyethoxy)ethyl)amino)-2-methylphenyl)diazenyl)-3,5-dimethylthiazol-3-ium-4-carboxylate |
| 78 | (E)-2-((4-(benzyl(2-(tert-butoxymethyl)-17-hydroxy-3,6,9,12,15-pentaoxaheptadecyl)amino)-2-methylphenyl)diazenyl)-3-methylthiazol-3-ium |
| 79 | (E)-2-((4-((2-(tert-butoxymethyl)-14-hydroxy-3,6,9,12-tetraoxatetradecyl)(ethyl)amino)-2-hydroxyphenyl)diazenyl)-3-methylthiazol-3-ium |
| 80 | (E)-2-((4-((13-(sec-butoxymethyl)-1-hydroxy-3,6,9,12-tetraoxapentadecan-15-yl)(2-(sec-butoxymethyl)-14-hydroxy-3,6,9,12-tetraoxatetradecyl)amino)-2-methylphenyl)diazenyl)-3-methylthiazol-3-ium |

In one aspect, suitable thiazolium dyes include thiazolium dye molecules numbers 1, 4, 5, 7, 8, 12, 13, 15, 16, 17, 21, 24, 25, 26, 30, 31, 33, 36, 38, 40, 45 and 48 as detailed in Tables 1 and 2 of the present specification.

In one aspect, suitable thiazolium dyes include thiazolium dye molecules numbers 12, 13, 15, 16, 24, 25, 26, 30, 31, 33, 36, 38, 40, 45 and 48 as detailed in Tables 1 and 2 of the present specification.

The suitable thiazolium dyes disclosed herein may be made by procedures known in the art and/or in accordance with the examples of the present specification.

Adjunct Materials

While not essential for the purposes of the present invention, the non-limiting list of adjuncts illustrated hereinafter are suitable for use in the laundry care compositions and may be desirably incorporated in certain embodiments of the invention, for example to assist or enhance performance, for treatment of the substrate to be cleaned, or to modify the aesthetics of the composition as is the case with perfumes, colorants, dyes or the like. It is understood that such adjuncts are in addition to the components that were previously listed for any particular embodiment. The total amount of such adjuncts may range from about 0.1% to about 50%, or even from about 1% to about 30%, by weight of the laundry care composition.

The precise nature of these additional components, and levels of incorporation thereof, will depend on the physical form of the composition and the nature of the operation for which it is to be used. Suitable adjunct materials include, but are not limited to, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' cleaning and laundry care compositions. Thus, certain embodiments of Applicants' compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants—The compositions according to the present invention can comprise a surfactant or surfactant system wherein the surfactant can be selected from nonionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Catalytic Metal Complexes—Applicants' compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methyl-enephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRL's herein are a special type of ultra-rigid ligand that is cross-bridged such as 5,12-diethyl-1,5,8,12-tetraazabicyclo[6.6.2]hexa-decane.

Suitable transition metal MRLs are readily prepared by known procedures, such as taught for example in WO 00/32601, and U.S. Pat. No. 6,225,464.

Processes of Making Laundry Care Compositions

The laundry care compositions of the present invention can be formulated into any suitable form and prepared by any process chosen by the formulator, non-limiting examples of which are described in U.S. Pat. No. 5,879,584; U.S. Pat. No. 5,691,297; U.S. Pat. No. 5,574,005; U.S. Pat. No. 5,569,645; U.S. Pat. No. 5,565,422; U.S. Pat. No. 5,516,448; U.S. Pat. No. 5,489,392; and U.S. Pat. No. 5,486,303.

In one aspect, the liquid detergent compositions disclosed herein may be prepared by combining the components thereof in any convenient order and by mixing, e.g., agitating, the resulting component combination to form a phase stable liquid detergent composition. In one aspect, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactant and the solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In another aspect of producing liquid detergents, the thiazolium dye is first combined with one or more liquid components to form a thiazolium dye premix, and this thiazolium dye premix is added to a composition formulation containing a substantial portion, for example more than 50% by weight, more than 70% by weight, or even more than 90% by weight, of the balance of components of the laundry detergent composition. For example, in the methodology described above, both the thiazolium dye premix and the enzyme component are added at a final stage of component additions. In another aspect, the thiazolium dye is encapsulated prior to addition to the detergent composition, the encapsulated dye is suspended in a structured liquid, and the suspension is added to a composition formulation containing a substantial portion of the balance of components of the laundry detergent composition.

Various techniques for forming detergent compositions in such solid forms are well known in the art and may be used herein. In one aspect, when the laundry care composition is in the form of a granular particle, the thiazolium dye is provided in particulate form, optionally including additional but not all components of the laundry detergent composition. The thiazolium dye particulate is combined with one or more additional particulates containing a balance of components of the laundry detergent composition. Further, the thiazolium dye, optionally including additional but not all components of the laundry detergent composition may be provided in an encapsulated form, and the thiazolium dye encapsulate is combined with particulates containing a substantial balance of components of the laundry detergent composition.

Methods of Using Laundry Care Compositions

The laundry care compositions disclosed in the present specification may be used to clean or treat a fabric. Typically at least a portion of the fabric is contacted with an embodiment of the aforementioned laundry care compositions, in neat form or diluted in a liquor, for example, a wash liquor and then the fabric may be optionally washed and/or rinsed. In one aspect, a fabric is optionally washed and/or rinsed, contacted with a an embodiment of the aforementioned laundry care compositions and then optionally washed and/or rinsed. For purposes of the present invention, washing includes but is not limited to, scrubbing, and mechanical agitation. The fabric may comprise most any fabric capable of being laundered or treated.

The laundry care compositions disclosed in the present specification can be used to form aqueous washing solutions for use in the laundering of fabrics. Generally, an effective amount of such compositions is added to water, preferably in a conventional fabric laundering automatic washing machine, to form such aqueous laundering solutions. The aqueous washing solution so formed is then contacted, preferably under agitation, with the fabrics to be laundered therewith. An effective amount of the laundry care composition, such as the liquid detergent compositions disclosed in the present specification, may be added to water to form aqueous laundering solutions that may comprise from about 500 to about 7,000 ppm or even from about 1,000 to about 3,000 pm of laundry care composition.

In one aspect, one or more of the thiazolium dyes disclosed in the present specification may be provided, for example via a laundry care composition, such that during the wash cycle and or rinse cycle the concentration of such one or more dyes may be from about 0.5 parts per billion (ppb) to about 5 part per million (ppm), from about 1 ppb to about 600 ppb, from about 5 ppb to about 300 ppb, or even from about 10 ppb to about 100 ppb of thiazolium dye. In one aspect such concentrations may be achieved during the washing cycle, and/or rinse cycle, of a 17 gallon automatic laundry washing machine.

In one aspect, the laundry care compositions may be employed as a laundry additive, a pre-treatment composition and/or a post-treatment composition.

Test Methods

I. Method for Determining of Hueing Efficiency for Detergents
   a.) Two 25 cm×25 cm fabric swatches of 16 oz white cotton interlock knit fabric (270 g/square meter, brightened with Uvitex BNB fluorescent whitening agent, from Test Fabrics. P.O. Box 26, Weston, Pa., 18643), are obtained.
   b.) Prepare two one liter aliquots of tap water containing 1.55 g of AATCC standard heavy duty liquid (HDL) test detergent as set forth in Table 3.
   c.) Add a sufficient amount the dye to be tested to one of the aliquots from Step b.) above to produce an aqueous solution absorbance of 1 AU.
   d.) Wash one swatch from a.) above in one of the aliquots of water containing 1.55 g of AATCC standard heavy duty liquid (HDL) test detergent and wash the other swatch in the other aliquot. Such washing step should be conducted for 30 minutes at room temperature with agitation. After such washing step separately rinse the swatches and dry the swatches.
   e.) After rinsing and drying each swatch, the hueing efficiency, $DE^*_{eff}$ of the dye is assessed by determining the $L^*$, $a^*$, and $b^*$ value measurements of each swatch using a Hunter LabScan XE reflectance spectrophotometer with D65 illumination, 10° observer and UV filter excluded. The hueing efficiency of the dye is then calculated using the following equation:

$$DE^*_{eff} = ((L^*_c - L^*_s)^2 + (a^*_c - a^*_s)^2 + (b^*_c - b^*_s)^2)^{1/2}$$

wherein the subscripts c and s respectively refer to the $L^*$, $a^*$, and $b^*$ values measured for the control, i.e., the fabric sample washed in detergent with no dye, and the fabric sample washed in detergent containing the dye to be screened.

II. Method for Determining Wash Removability
   a.) Prepare two separate 150 ml aliquots of HDL detergent solution set forth in Table 1, according to AATCC Test Method 61-2003, Test 2A and containing 1.55 g/liter of the AATCC HDL formula in distilled water.
   b.) A 15 cm×5 cm sample of each fabric swatch from the Method for Determining of Hueing Efficiency For Detergents described above is washed in a Launderometer for 45 minutes at 49° C. in 150 ml of a the HDL detergent solution prepared according to Step II. a.) above.
   c.) The samples are rinsed with separate aliquots of rinse water and air dried in the dark, the amount of residual coloration is assessed by measuring the $DE^*_{res}$, of the dye is assessed by determining the $L^*$, $a^*$, and $b^*$ value measurements of each swatch using a Hunter LabScan XE reflectance spectrophotometer with D65 illumination, 10° observer and UV filter excluded. The hueing efficiency of the dye is then calculated using the following equation:

$$DE^*_{res} = ((L^*_c - L^*_s)^2 + (a^*_c - a^*_s)^2 + (b^*_c - b^*_s)^2)^{1/2}$$

wherein the subscripts c and s respectively refer to the $L^*$, $a^*$, and $b^*$ values measured for the control, i.e., the fabric sample initially washed in detergent with no dye, and the fabric sample initially washed in detergent containing the dye to be screened. The wash removal value for the dye is then calculated according to the formula: % removal = $100 \times (1 - DE^*_{res}/DE^*_{eff})$.

TABLE 3

| Ingredient | weight percent |
| --- | --- |
| C11.8 linear alkylbenzene sulfonic acid | 12.00 |
| Neodol 23-9 | 8.00 |
| citric acid | 1.20 |
| C12-14 fatty acid | 4.00 |
| sodium hydroxide[1] | 2.65 |
| ethanolamine | 0.13 |
| borax | 1.00 |
| DTPA[2] | 0.30 |
| 1,2-propanediol | 8.00 |
| brightener 15 | 0.04 |
| water | balance |

[1] formula pH adjusted to 8.5
[2] diethylenetriaminepentaacetic acid, pentasodium salt

EXAMPLES

The following examples illustrate the compositions of the present invention but are not necessarily meant to limit or otherwise define the scope of the invention herein.

Example 1

The following liquid formulas are within the scope of the present invention.

| Ingredient | 1a wt % | 1b wt % | 1c wt % | 1d wt % | 1e wt % | 1f[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Compound 16 of Table 1 | 0.005% | 0.005% | | | | |
| Compound 24 of Table 1 | | | 0.005% | | | |
| Compound 13 of Table 1 | | | | 0.008% | | |
| Compound 36 of Table 1 | | | | | 0.008% | |
| Compound 21 of Table 1 | | | | | | 0.015% |
| Liquitint Aqua AS[4] | | 0.005% | | | | |
| opacifier[6] | | 0.5% | | | | |
| water | balance | balance | balance | balance | balance | balance |
| | 100.0% | 100.0% | 100.0% | 100.0% | 100.0% | 100.0% |

[1]diethylenetriaminepentaacetic acid, sodium salt
[2]diethylenetriaminepentakismethylenephosphonic acid, sodium salt
[3]ethylenediaminetetraacetic acid, sodium salt
[4]a non-tinting dye used to adjust formula color
[5]compact formula, packaged as a unitized dose in polyvinyl alcohol film
[6]Acusol OP 301

Example 2

The following granular detergent formulas are within the scope of the present invention.

| Ingredient | 2a wt % | 2b wt % | 2c wt % | 2d wt % |
|---|---|---|---|---|
| Na linear alkylbenzene sulfonate | 3.4% | 3.3% | 11.0% | 3.4% |
| Na alkylsulfate | 4.0% | 4.1% | | 4.0% |
| Na alkyl sulfate (branched) | 9.4% | 9.6% | | 9.4% |
| alkyl ethoxylate | | | 3.5% | |
| type A zeolite | 37.4% | 35.4% | 26.8% | 37.4% |
| sodium carbonate | 22.3% | 22.5% | 35.9% | 22.3% |
| sodium sulfate | 1.0% | | 18.8% | 1.0% |
| sodium silicate | | | 2.2% | |
| protease | 0.1% | 0.2% | | 0.1% |
| sodium polyacrylate | 1.0% | 1.2% | 0.7% | 1.0% |
| carboxymethylcellulose | | | 0.1% | |
| PEG 600 | | 0.5% | | |
| PEG 4000 | | 2.2% | | |
| DTPA | 0.7% | 0.6% | | 0.7% |
| fluorescent whitening agent | 0.1% | 0.1% | 0.1% | 0.1% |
| sodium percarbonate | | 5.0% | | |
| sodium nonanoyloxy-benzenesulfonate | | 5.3% | | |
| silicone suds suppressor | 0.02% | 0.02% | | 0.02% |
| perfume | 0.3% | 0.3% | 0.2% | 0.3% |
| Compound 15 of Table 1 | 0.015%[1] | | | |
| Compound 48 of Table 1 | | 0.017%[2] | | |
| Compound 38 of Table 1 | | | 0.017%[3] | |
| Compound 33 of Table 1 | | | | 0.02%[4] |
| water and miscellaneous | balance | balance | balance | balance |

[1]formulated as a particle containing 0.5% dye, 99.5% PEG 4000
[2]formulated as a layered particle containing 2% dye according to US 2006 252667 A1
[3]formulated as a particle containing 0.5% dye according to U.S. Pat. No. 4,990,280
[4]formulated as a particle containing 0.5% dye with zeolite

Example 3

The following rinse added fabric conditioning formulas are within the scope of the present invention.

| Ingredients | 3a | 3b | 3c | 3d |
|---|---|---|---|---|
| Fabric Softening Active[a] | 13.70% | 13.70% | 13.70% | 13.70% |
| Ethanol | 2.14% | 2.14% | 2.14% | 2.14% |
| Cationic Starch[b] | 2.17% | 2.17% | 2.17% | 2.17% |
| Perfume | 1.45% | 1.45% | 1.45% | 1.45% |
| Phase Stabilizing Polymer[c] | 0.21% | 0.21% | 0.21% | 0.21% |
| Calcium Chloride | 0.147% | 0.147% | 0.147% | 0.147% |
| DTPA[d] | 0.007% | 0.007% | 0.007% | 0.007% |
| Preservative[e] | 5 ppm | 5 ppm | 5 ppm | 5 ppm |
| Antifoam[f] | 0.015% | 0.015% | 0.015% | 0.015% |
| Compound 45 of Table 1 | 30 ppm | | | 15 ppm |
| Compound 25 of Table 1 | | 30 ppm | | |
| Compound 30 of Table 1 | | | 30 ppm | 15 ppm |
| Tinopal CBS-X[g] | 0.2 | 0.2 | 0.2 | 0.2 |
| Ethoquad C/25[h] | 0.26 | 0.26 | 0.26 | 0.26 |
| Ammonium Chloride | 0.1% | 0.1% | 0.1% | 0.1% |
| Hydrochloric Acid | 0.012% | 0.012% | 0.012% | 0.012% |
| Deionized Water | Balance | Balance | Balance | Balance |

[a]N,N-di(tallowoyloxyethyl)-N,N-dimethylammonium chloride.
[b]Cationic starch based on common maize starch or potato starch, containing 25% to 95% amylose and a degree of substitution of from 0.02 to 0.09, and having a viscosity measured as Water Fluidity having a value from 50 to 84.
[c]Copolymer of ethylene oxide and terephthalate having the formula described in U.S. Pat. No. 5,574,179 at col.15, lines 1-5, wherein each X is methyl, each n is 40, u is 4, each $R^1$ is essentially 1,4-phenylene moieties, each $R^2$ is essentially ethylene, 1,2-propylene moieties, or mixtures thereof.
[d]Diethylenetriaminepentaacetic acid.
[e]KATHON ® CG available from Rohm and Haas Co.
[f]Silicone antifoam agent available from Dow Corning Corp. under the trade name DC2310.
[g]Disodium 4,4'-bis-(2-sulfostyryl) biphenyl, available from Ciba Specialty Chemicals.
[h]Cocomethyl ethoxylated [15] ammonium chloride, available from Akzo Nobel Example 4

Synthesis of Mtol-10EO Methylthiazolium

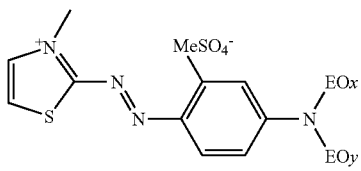

x + y = 10

Five hundred and forty-nine grams of 85% phosphoric acid, 75 grams of 98% sulfuric acid and 9 drops of 2-ethyl hexanol defoamer are added to a 100 milliliter three necked flask equipped with a thermometer, cooling bath, and mechanical stirrer. The mixture is cooled and 30.9 grams of 2-aminothiazole is added to the flask. The mixture is further cooled to below 0° C. after which 105 grams of 40% nitrosyl sulfuric acid are added while the temperature is maintained below 5° C. After three hours the mixture gives a positive nitrite test and 25 grams of sulfamic acid are added slowly while the temperature is kept below 5° C. A negative nitrite test is evident after one hour.

A 2000 milliliter beaker is charged with 190 grams 10 EO m-toluidine intermediate, 200 grams of water, 200 grams of ice and 12 grams of urea. The mixture is cooled to 0° C. The diazo solution is added dropwise to the beaker over about 30 minutes, while maintaining the temperature below 10° C. The resulting mixture is stirred for several hours and allowed to stand overnight, after which 780 grams of 50% sodium hydroxide is added to neutralize excess acid to a pH of about 7 while the temperature is kept below 20° C. The bottom salt layer is removed and the product is washed with 200 milliliters of a 10% sodium sulfate solution. The aqueous layer is removed and the desired product is obtained as an orange liquid (240 grams, 70% actives).

One hundred grams of the orange liquid from above and 28.40 grams of dimethyl sulfate are placed into a 500 milliliter flask equipped with a reflux condenser, thermometer, heating mantle and mechanical stirrer. The reaction mixture is heated to 70° C. for two hours. The reaction is cooled and the pH is adjusted to 7 with 10 grams of 20% ammonium hydroxide and is used without further purification.

Example 5

The procedure of Example 4 is used to make N-ethyl-mtol-5EO

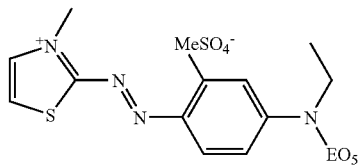

with the difference being the use of the following m-toluidine intermediate:

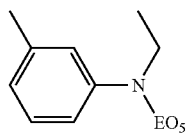

Example 6

The procedure of Example 5, with the noted changes, is used to make:

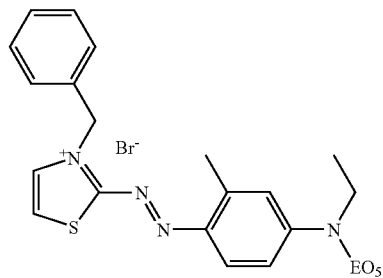

Twenty grams of the orange liquid per Example 5, as obtained via Example 4, and nine grams of benzyl bromide are placed into a 250 milliliter flask equipped with a reflux condenser, thermometer, heating mantle and mechanical stirrer. The reaction mixture is heated to 70° C. for two hours. The reaction is cooled and the pH is adjusted to 7 with 4 grams of 50% sodium hydroxide and is used without further purification.

While particular embodiments of the present invention have been illustrated and described, it would be obvious to those skilled in the art that various other changes and modifications can be made without departing from the spirit and scope of the invention. It is therefore intended to cover in the

What is claimed is:

1. A whitening agent for laundry care compositions comprising a thiazolium dye selected from (E)-2-((4-(bis(14-hydroxy-3,6,9,12-tetraoxatetradecyl)amino)-2-methylphenyl)diazenyl)-5-methoxy-3-methylbenzo[d]thiazol-3-ium; (E)-2-((4-((3-tert-butoxy-2-(2-(2-(2-hydroxyethoxy)ethoxy)ethoxy)propyl)(3-tert-butoxy-2-(2-(2-hydroxyethoxy)ethoxy)propyl)amino)-2-methylphenyl)diazenyl)-3-methylthiazol-3-ium; (E)-2-((4-((3-butoxy-2-(2-(2-(2-hydroxyethoxy)ethoxy)ethoxy)propyl)(3-butoxy-2-(2-(2-hydroxyethoxy)ethoxy)propyl)amino)-2-methylphenyl)diazenyl)-3-methylthiazol-3-ium; (E)-2-((1-(29-hydroxy-3,6,9,12,15,16,21,24,27-nonaoxanonacosyl)-1,2,3,4-tetrahydroquinolin-6-yl)diazenyl)-3-methylthiazol-3-ium; (E)-2-((4-(bis(2-(2-(2-(2-hydroxyethoxy)ethoxy)ethoxy)ethyl)amino)-2-methylphenyl)diazenyl)-3-ethylthiazol-3-ium; (E)-2-((4-(benzyl(14-hydroxy-3,6,9,12-tetraoxatetradecyl)amino)-2-methylphenyl)diazenyl)-3-ethylthiazol-3-ium; and mixtures thereof.

2. A whitening agent for laundry care compositions comprising a thiazolium dye selected from (E)-2-((4-(bis(2-(2-(2-(2-hydroxyethoxy)ethoxy)ethoxy)ethyl)amino)-2-methylphenyl)diazenyl)-3-ethylthiazol-3-ium; (E)-3-benzyl-2-((4-((2-(2-(2-hydroxyethoxy)ethoxy)ethyl)(2-(2-hydroxyethoxy)ethyl)amino)phenyl)diazenyl)thiazol-3-ium; (E)-3-benzyl-2-((1-(29-hydroxy-3,6,9,12,15,18,21,24,27-nonaoxanonacosyl)-1,2,3,4-tetrahydroquinolin-6-yl)diazenyl)thiazol-3-ium; (E)-3-benzyl-2-((4-((2-(2-(2-hydroxyethoxy)ethoxy)ethyl)(2-hydroxyethoxy)ethyl)amino)-2-methylphenyl)diazenyl)thiazol-3-ium; (E)-2-((4-(benzyl(29-hydroxy-3,6,9,12,16,18,21,24,27-nonaoxanonacosyl)amino)-2-methylphenyl)diazenyl)-3-methylthiazol-3-ium; (E)-2-((4-(bis(14-hydroxy-3,6,9,12-tetraoxatetradecyl)amino)-2,6-dimethylphenyl)diazenyl)-3-methylthiazol-3-ium; (E)-2-((4-((4-(17-hydroxy-3,6,9,12,15-pentaoxaheptadecyloxy)-3-methoxybenzyl)(methyl)amino)-2-methylphenyl)diazenyl)-3-methylthiazol-3-ium; (E)-2-((1-(1-hydroxy-2,5,8,11,14,17,20,23,26-nonaoxaoctacosan-28-yl)-1,2,3,4-tetrahydroquinolin-6-yl)diazenyl)-3-methylthiazol-3-ium; and mixtures thereof.

3. A whitening agent for laundry care compositions comprising a thiazolium dye selected from (E)-2-((4-((2-hydroxyethyl)(methyl)amino)phenyl)diazenyl)-3-methylthiazol-3-ium; (E)-2-((4-(bis(2-(2-(2-hydroxypropoxy)propoxy)ethyl)amino)phenyl)diazenyl)-3-methylthiazol-3-ium; (E)-2-((4-((14-hydroxy-3,6,9,12-tetraoxatetradecyl)(1-hydroxy-3,6,9,13-tetraoxapentadecan-15-yl)amino)-2-methylphenyl)diazenyl)-6-methoxy-3-methylbenzo[d]thiazol-3-ium; (E)-2-((4-(benzyl(29-hydroxy-3,6,9,12,15,18,21,24,27-nonaoxanonacosyl)amino)phenyl)diazenyl)-3-methylthiazol-3-ium; (E)-2-((4-(benzyl(3-(3-(3-(2,3-dihydroxypropoxy)-2-hydroxypropoxy)-2-hydroxypropoxy)-2-hydroxypropyl)amino)-2-methylphenyl)diazenyl)-3-methylthiazol-3-ium; (E)-2-((4-(bis(14-hydroxy-3,6,9,12-tetraoxatetradecyl)amino)-2,5-dimethylphenyl)diazenyl)-6-methoxy-3-methylbenzo[d]thiazol-3-ium; (E)-3-ethyl-2-((4-(ethyl(14-hydroxy-3,6,9,12-tetraoxatetradecyl)amino)-2-methylphenyl)diazenyl)thiazol-3-ium; (E)-3-ethyl-2-((1-(29-hydroxy-3,6,9,12,15,18,21,24,27-nonaoxanonacosyl)-1,2,3,4-tetrahydroquinolin-6-yl)diazenyl)thiazol-3-ium; and mixtures thereof.

4. A whitening agent for laundry care compositions comprising a thiazolium dye selected from (E)-3-ethyl-2-((1-(29-hydroxy-3,6,9,12,15,18,21,24,27-nonaoxanonacosyl)-1,2,3,4-tetrahydroquinolin-6-yl)diazenyl)thiazol-3-ium; (E)-2-((4-((2-(2-(2-hydroxyethoxy)ethoxy)ethyl)(2-(2-hydroxyethoxy)ethyl)amino)-2-methylphenyl)diazenyl)-3,5-dimethylthiazol-3-ium; (E)-3-ethyl-2-((4-((2-(2-(2-hydroxyethoxy)ethoxy)ethyl)(2-(2-hydroxyethoxy)ethyl)amino)-2-methylphenyl)diazenyl)-5-methylthiazol-3-ium; (E)-2-((4-((2-(2-(2-hydroxyethoxy)ethoxy)ethyl)(2-(2-hydroxyethoxy)ethyl)amino)-2-methylphenyl)diazenyl)-3,5-dimethylthiazol-3-ium; (E)-3-ethyl-2-((4-((2-(2-(2-hydroxyethoxy)ethoxy)ethyl)(2-(2-hydroxyethoxy)ethyl)amino)-2-methylphenyl)diazenyl)-5-methylthiazol-3-ium; (E)-2-((4-((2-(2-(2-hydroxyethoxy)ethoxy)ethyl)(2-(2-hydroxyethoxy)ethyl)amino)-2-methylphenyl)diazenyl)-3,5-dimethylthiazol-3-ium; 2-((E)-(4-((14-hydroxy-3,6,9,12-tetraoxatetradecyl)(17-hydroxy-3-(4-((E)-thiazol-2-yldiazenyl)phenyl)-6,9,12,15-tetraoxa-3-azaheptadecyl)amino)phenyl)diazenyl)-3-methylthiazol-3-ium; and mixtures thereof.

* * * * *